US006829635B1

(12) United States Patent
Townshend (10) Patent No.: US 6,829,635 B1
(45) Date of Patent: Dec. 7, 2004

(54) SYSTEM AND METHOD OF AUTOMATICALLY GENERATING THE CRITERIA TO IDENTIFY BULK ELECTRONIC MAIL

(75) Inventor: Brent Townshend, 156 University Dr., Menlo Park, CA (US) 94025

(73) Assignee: Brent Townshend, Menlo Park, CA (US)

( * ) Notice: Subject to any disclaimer, the term of this patent is extended or adjusted under 35 U.S.C. 154(b) by 0 days.

(21) Appl. No.: 09/108,527

(22) Filed: Jul. 1, 1998

(51) Int. Cl.[7] .............................................. G06F 15/16

(52) U.S. Cl. ...................................................... 709/206

(58) Field of Search ................................ 709/200–253, 709/100–108; 718/1–108; 713/100

(56) References Cited

U.S. PATENT DOCUMENTS

| | | | | |
|---|---|---|---|---|
| 5,333,266 A | * | 7/1994 | Boaz et al. .................. | 709/206 |
| 5,619,648 A | * | 4/1997 | Canale et al. ............... | 709/206 |
| 6,052,709 A | * | 4/2000 | Paul ........................... | 709/202 |
| 6,161,130 A | * | 12/2000 | Horvitz et al. .............. | 709/206 |
| 6,460,036 B1 | * | 10/2002 | Herz ........................... | 707/10 |
| 2002/0016824 A1 | * | 2/2002 | Leeds ......................... | 709/207 |
| 2002/0016916 A1 | * | 2/2002 | Natarajan ................... | 713/179 |
| 2002/0026634 A1 | * | 2/2002 | Shaw .......................... | 717/173 |

* cited by examiner

Primary Examiner—Meng-Al T. An
Assistant Examiner—Kenneth Tang
(74) Attorney, Agent, or Firm—Marcel K. Bingham; Hickman Palermo Truong & Becker LLP (57) ABSTRACT

A method and apparatus for identifying bulk electronic mail is provided. The contents of a plurality of electronic mail messages are tracked and used to determine whether a particular electronic mail message is bulk electronic mail or not bulk electronic mail. The manner in which an electronic mail message is processed depends on the type of the electronic mail message. In particular, a message signature is generated from the contents of the electronic mail message and transmitted to a central server. The central server generates a count of how many other previously received signatures match the just generated message signature. The count is transmitted to the electronic mail server that transmitted the particular message signature. If the count meets a predetermined threshold, the electronic mail server marks the electronic mail message as bulk electronic mail. Alternatively, the central server transmits the message signature of an identified bulk electronic mail message to an electronic mail server. The electronic mail server then compares this message signature with the message signature of another electronic mail message received by the electronic mail server in order to determine whether the received electronic mail message is bulk electronic mail.

38 Claims, 6 Drawing Sheets

SYSTEM AND METHOD OF AUTOMATICALLY GENERATING THE CRITERIA TO IDENTIFY BULK ELECTRONIC MAIL

FIELD OF THE INVENTION

The present invention relates to the filtering of electronic mail.

BACKGROUND OF THE INVENTION

The usage of Internet electronic mail is proliferating. Internet electronic mail is more often becoming a replacement or supplement to the telephone, facsimile, and postal mail. However, a difficulty with this media is unsolicited bulk electronic mail that is sent by "electronic marketers" marketing their products. To electronic marketers, the unit cost of soliciting each recipient is virtually zero, making Internet electronic mail a very attractive solicitation distribution mechanism, even if a very low percentage of the recipients respond.

The cost, however, to recipients of bulk electronic mail is substantial. Beyond consumption of Internet resources used in transmission, bulk electronic mail results in its recipients frequently finding their electronic inbox inundated with undesired electronic mail. This inundation greatly reduces the utility of the electronic mail because time is wasted in reviewing the inbox to separate the desired electronic mail from the undesired. In addition, many electronic mail users "download" their mail to a local workstation. For these users, the download time can be significantly increased due to electronic mail they do not want to read anyway.

Various providers of electronic mail services (e.g. Internet providers) and software developers have attempted to alleviate this problem through the use of filters. Typically, these filters operate by blocking electronic mail that originates from sites or addresses identified as a source of bulk electronic mail. This approach to filtering has several serious drawbacks. First, it requires that the appropriate sites or addresses be identified and added to a filter list. Since the bulk electronic marketers want their material to reach as large an audience as possible, they quickly react to such filtering by moving to another source address or site. Second, blocking a site blocks all electronic mail from that site. For a particular recipient, some electronic mail solicitation from a blocked site may be desired.

Even more problematic is the common practice of forging the source address of bulk electronic mail so that is appears to come from legitimate sources. Such forgery makes electronic mail difficult to filter without affecting the innocent holder of the forged address. In some cases, the problem is so extreme that the users choose to filter all electronic mail except that from a selected list of originators. This measure greatly limits the flexibility of the media.

Based on the foregoing, it is clearly desirable to provide a method of filtering electronic mail that effectively filters unwanted bulk e-mail without relying exclusively upon the originator information in the electronic mail to indicate whether an electronic mail message is a "bulk" message.

SUMMARY OF THE INVENTION

A method and apparatus for identifying bulk electronic mail is provided. According to an aspect of the present invention, the contents of a plurality of electronic mail messages are tracked and used to determine whether a particular electronic mail message is bulk electronic mail or not bulk electronic mail. The manner in which an electronic mail message is processed depends on the type of the electronic mail message.

According to another aspect of the present invention, a message signature is generated from the contents of the electronic mail message and transmitted to a central server. The message server may have one or more signature elements. The central server generates counts of how many other signature elements of previously received signatures match signature elements of the just generated message signature. One or more of the counts are transmitted to the electronic mail server that transmitted the particular message signature. If the one or more counts meet a predetermined threshold, the electronic mail server marks the electronic mail message as bulk electronic mail.

According to another aspect of the present invention, the central server transmits the message signature of an identified bulk electronic mail message to an electronic mail server. The electronic mail server then compares this message signature with the message signature of another electronic mail message received by the electronic mail server in order to determine whether the received electronic mail message is bulk electronic mail.

Another aspect of the present invention, code or data is transmitted to an electroic mail server to alter the manner in which message signatures are generated. Furthermore, an electronic mail server generates, in addition to a message signature, a recipient signature, and transmits both to a central server. The central server maintains a count of how many unique signature elements recipient signature combinations it has received. If the count exceeds a threshold, then electronic mail messages with those signature elements are treated as bulk electronic mail messages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for filtering electronic mail is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques for identifying which electronic mail messages are "bulk" electronic mail messages are described herein. Rather then rely exclusively on the originators specified in electronic mail messages determine they are bulk, the techniques make the "bulk determination" based on the contents of the electronic mail messages. Specifically, a set of criteria is automatically generated based on the contents electronic mail messages. Those electronic mail messages that satisfy the criteria are handled as bulk mail.

The set of criteria may include, for example, that the received electronic mail message has a message signature with signature elements that match a threshold number of signatures elements of other electronic mail messages. A message signature is generated from the contents of an electronic mail message. A message signature includes one or more signature elements. As another example, the set of criteria may include that the received electronic mail message have a message signature with at least one signature element that matches a signature element of an electronic mail message that has been identified as bulk. "Automatically generated" refers to the fact that a user or electronic mail client does not have to expressly specify which electronic mail messages are bulk. Finally, "based on the content of mail messages" refers to the fact that the set of criteria is based on at least a portion of the data contained in a set electronic mail messages.

Electronic mail messages that are found to be bulk electronic mail messages may be flagged or deleted. Once the electronic mail message is flagged, subsequent servers involved with the message delivery do not need to compare the contents of the electronic mail messages. Electronic mail clients can be individually configured to hide or display bulk email, thus allowing each recipient user to decide if and when to receive such electronic mail.

Specifically, when an electronic mail server receives an electronic mail message, the electronic mail server invokes a signature generator to generate a message signature. A message signature is data derived from the content of an electronic mail message, or any portion thereof, that is used to identify electronic mail messages with substantially similar content. Thus, two messages that cause the same one or more signature element to be generated are presumed to have substantially similar content. After being generated at one of possibly many mail servers, the message signature is then transmitted to a central server. A central server is a set of one or more computer processes that operates upon received message signatures to generate and transmit data indicating which signatures represent bulk electronic mail.

When a central server receives a message signature, the central server generates a count of how many times a matching signature elements in the message signature have been previously received. The central server transmits the count of the most frequently matched signature element to the electronic mail server that transmitted the just received message signature. If the count meets a predetermined threshold, the electronic mail server marks the electronic mail message as bulk electronic mail According to another aspect of the invention, a recipient signature is generated and transmitted to the central server along with the message signature. A recipient signature is data derived from the data within an electronic mail message that specifies the recipient, or any portion of that data. The recipient signature is used to uniquely identify the recipient of a message. Thus, two messages that generate the same recipient signature are presumed to be directed to the same recipient. Once a central server receives a recipient signature with the signature element of a message signature, the central server does not count the signature element or a message signature if the accompanying recipient is matched by any other recipient signature that previously accompanied the signature element.

The techniques described herein offer advantages over the conventional approaches for identifying bulk electronic mail. Because the identification of bulk electronic mail is based on comparing the contents of electronic mail messages rather than the specified source, explicit filter lists of sources do not have to be predetermined or maintained. The use of source forgery does not affect the identification of bulk electronic mail. Electronic mail that is not bulk electronic mail is not affected because of the source of the electronic mail. Finally, individuals can configure their electronic mail clients to block the reception of the bulk electronic mail, or direct the bulk electronic mail to a designated set of mail boxes, where the bulk electronic mail can be viewed when desired.

To reduce network traffic, some electronic mail servers do not transmit signatures to a central server. Instead, the central server may transmit message signatures of bulk electronic mail to the electronic mail servers. The electronic mail servers then use the bulk electronic mail signatures to determine whether an incoming electronic mail message has the same signature as that of a bulk electronic mail signature. If so, the electronic mail message is marked as bulk electronic mail.

To thwart countermeasures used by bulk electronic mailers to circumvent the techniques for identifying bulk electronic mail described herein, the operation of signature generators may need to be periodically modified. To facilitate a rapid response to these countermeasures, code (e.g. Java™ byte code) or data (e.g. parameters) may be transmitted over a network to electronic mail servers in order to change the operation of signature generators.

Exemplary Electronic Mail System

The techniques described identify electronic mail messages transported over a networked electronic mail system. To facilitate an understanding of these techniques, a description of an exemplary networked electronic mail system upon which an embodiment of the present invention may operate is provided.

Figure 1:
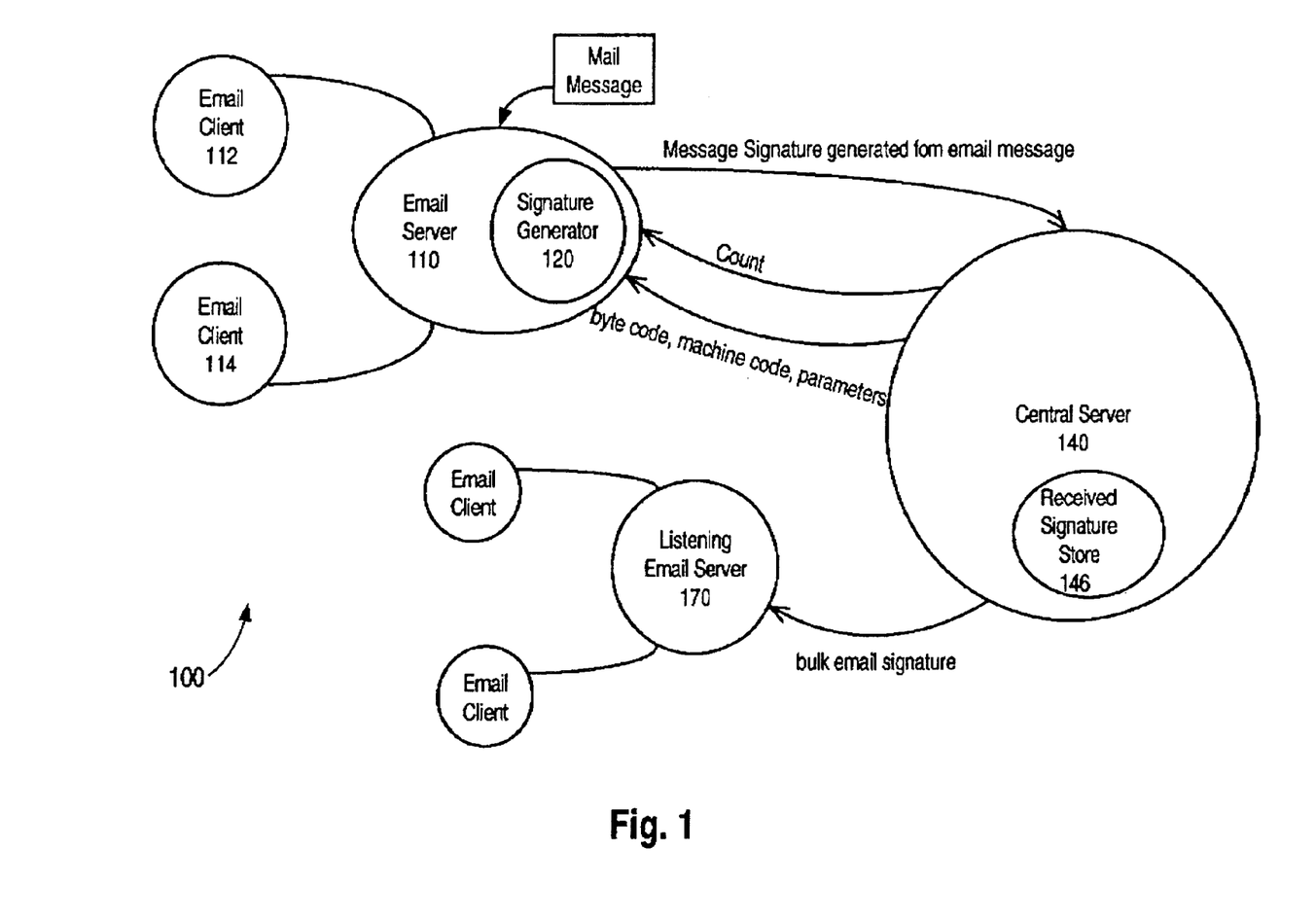
FIG. 1 is a block diagram depicting an exemplary electronic mail system upon which an embodiment of the present invention may operate.

FIG. 1 is a block diagram depicting exemplary electronic mail system 100. Electronic Mail Server 110 receives, sends, and stores electronic mail messages from and to other electronic mail servers (e.g. electronic mail server 170) on behalf of a group of one or more recipients (e.g. human individuals, computer processes). Electronic mail clients, such as electronic mail client 112, receive and send electronic mail messages on behalf of one or more recipients, and operate as an interface between the one or more recipients and an electronic mail server, such as electronic mail server 110.

Electronic mail client 112 interacts with electronic mail server 110 to retrieve data from electronic mail messages received by electronic mail server 110, and to send electronic mail messages. Electronic mail client 112 communicates with electronic mail server 110 through a communication mechanism, such as a network (e.g. WAN, Internet 628). Alternatively, electronic mail client 112 and electronic mail server 110 may reside on the same physical computer machine, and communicate through inter-process communication mechanisms well known to those skilled in the art.

In an embodiment of the present invention, electronic mail server 110 includes signature generator 120. Electronic mail server 110 invokes signature generator 120, passing in the received electronic mail message as input (e.g. passing in a reference to the received electronic mail). Signature generator 120 operates upon the received electronic mail message to generate a message signature. After generating a message signature, signature generator 120 returns the message signature to electronic mail server 110, which, in turn, transmits the message signature to central server 140.

Electronic mail client 112 communicates with central server 140 through a communication mechanism, such as a network (e.g. WAN, Internet 628). Alternatively, electronic mail server 110 and central server 140 may reside on the same physical computer, and may communicate through inter-process communication mechanisms well known to those skilled in the art.

Central server 140 receives signatures from a plurality of electronic mail servers, and stores data about the received signatures in received signature store 146. The received signature store is a data structure containing records for signature elements of message signatures received by a central server. The central server uses data in received signature 146 store to determine a count of matching signature elements to return to the electronic mail server.

In an embodiment of the present invention, the received signature store 146 is an indexed table with multiple records. Each record contains a signature element, a count, and age indicating a number of time periods (e.g. days) since the signature element was last received. Received signature store 146 is indexed by signature element by using, for example, a hash table index.

The age stored in each record in received signature store 146 is maintained so that the age reflects the number of periods since the corresponding signature element was last received. When the signature element is received, and a record for already exists, the age is reset to zero (or zero's equivalent). At regular intervals (e.g. daily), the age stored in each record is incremented. Those records containing ages that are greater than a threshold (e.g. 3) are deleted. If after the record is deleted the signature element is received by central server 140, a new record for the particular signature element is generated. By maintaining records in this fashion, the size of the received signature store is finite.

Although one format of a received signature store is described, alternatives are possible. It is therefore understood that the present invention is not limited to any particular data structure for a received signature store.

For example, the received signature store may be a table that contains a record each time a signature element is received. The first time a signature element is received, a record is created that includes a time stamp specifying when signature element was received. The second time the signature element is received, a second record is created with a time stamp of when the time signature element was received the second time.

Exemplary Electronic Mail System and Signature

The techniques described herein involve the use of message signatures generated from electronic mail messages. To facilitate an understanding of these techniques, a description of an exemplary electronic mail message and message signature is provided.

Figure 2:
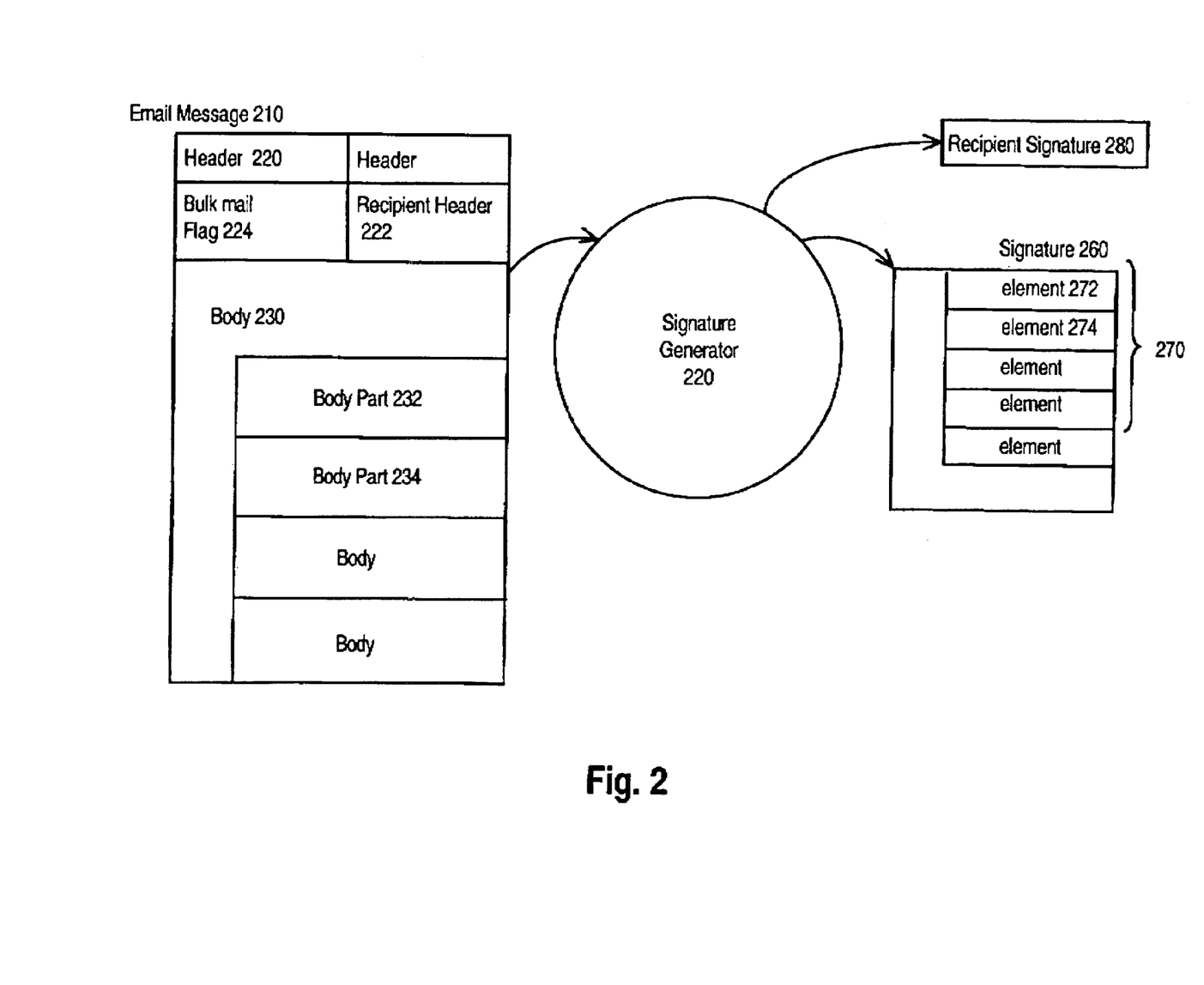
FIG. 2 is a block diagram depicting an exemplary signature generator, an exemplary electronic mail message, and an exemplary message signature according to an embodiment of the present invention.

FIG. 2 is a block diagram depicting an exemplary signature generator 120, which operates upon the contents of exemplary electronic mail message 210 to generate exemplary message signature 260. Electronic mail message 210 includes body 230 and one or more headers, such as header 220. Body 230 includes one or more body parts such as body part 232. If the electronic mail message 210 has been identified as a bulk electronic mail message, then electronic mail message 210 may contain bulk mail flag 224. A bulk mail flag is any data contained in an electronic mail message that is used to specify that the electronic mail message has been identified as bulk electronic mail. Bulk mail flag 234 may be in the form of, for example, a header element in an electronic mail message.

In one embodiment of the present invention, electronic mail message 210 is organized in accordance with Request for Comments #822, "Standard for the format of ARPA block Internet text messages," by David H. Crocker, August, 6982, herein referred to as RFC #822. In addition, the header fields and body parts of electronic mail message 210 may be organized according to the Multipurpose Internet Mail Extensions ("MIME") protocol. MIME is described in Request for Comments 1042, "Multi-Internet Mail Extensions," (MIME) part 6, N.Free, N. Borensten, November, 6996, and related requests for comments.

While one electronic mail message format has been described, alternatives are possible. For example, electronic mail message 210 may be organized according to the X.400 recommendation, promulgated by the Telecommunications Standardization Sector of the International Telecommunication Union. Or, electronic mail message 210 may be organized according to other standards, including proprietary standards, or a combination of one or more standards. Therefore, it is understood, that the present invention is not limited to any particular electronic mail message formal Signature generator 120 generates message signature 260, which may include one or more signature elements 270. In one embodiment of the present invention, signature generator 120 generates one or more signature elements 270 by applying a one way hash function to a portion of electronic mail message 210. For example, signature generator 120 may read data from a portion of body part 232, and apply a first one-way hash function to the read data to produce element 272. Likewise, signature generator 120 may read data from a portion of body part 234, and apply a second hash function to produce element 274.

Alternatively, signature generator 120 may read portions of multiple body parts within electronic mail message 210, apply a hash value function to the read data to generate element 272. Likewise, signature generator 120 may read other portions of multiple body parts within electronic mail message 210, and apply a hash function to the read data to generate element 274.

There are numerous other mechanisms or techniques that may be used to generate a message signature. For example, a signature element may be generated from a single paragraph, from a single paragraph of a given size, from a set of words in an electronic mail message that are in a dictionary, or from words appearing a given number times, or from all of an electronic mail message but the first and last n lines. Instead of applying a one-way hash function, an signature element may be generated by applying a function that returns a CRC-32 value. Furthermore, it is not necessary that a message signature be a composite data structure with multiple elements or data structures. It may simply be, for example, a single numeric value. Therefore, it is understood that the present invention is not limited to any particular mechanism, technique, or data structure for generating message signatures.

Identifying Bulkmail Based on Counts

Figure 3:
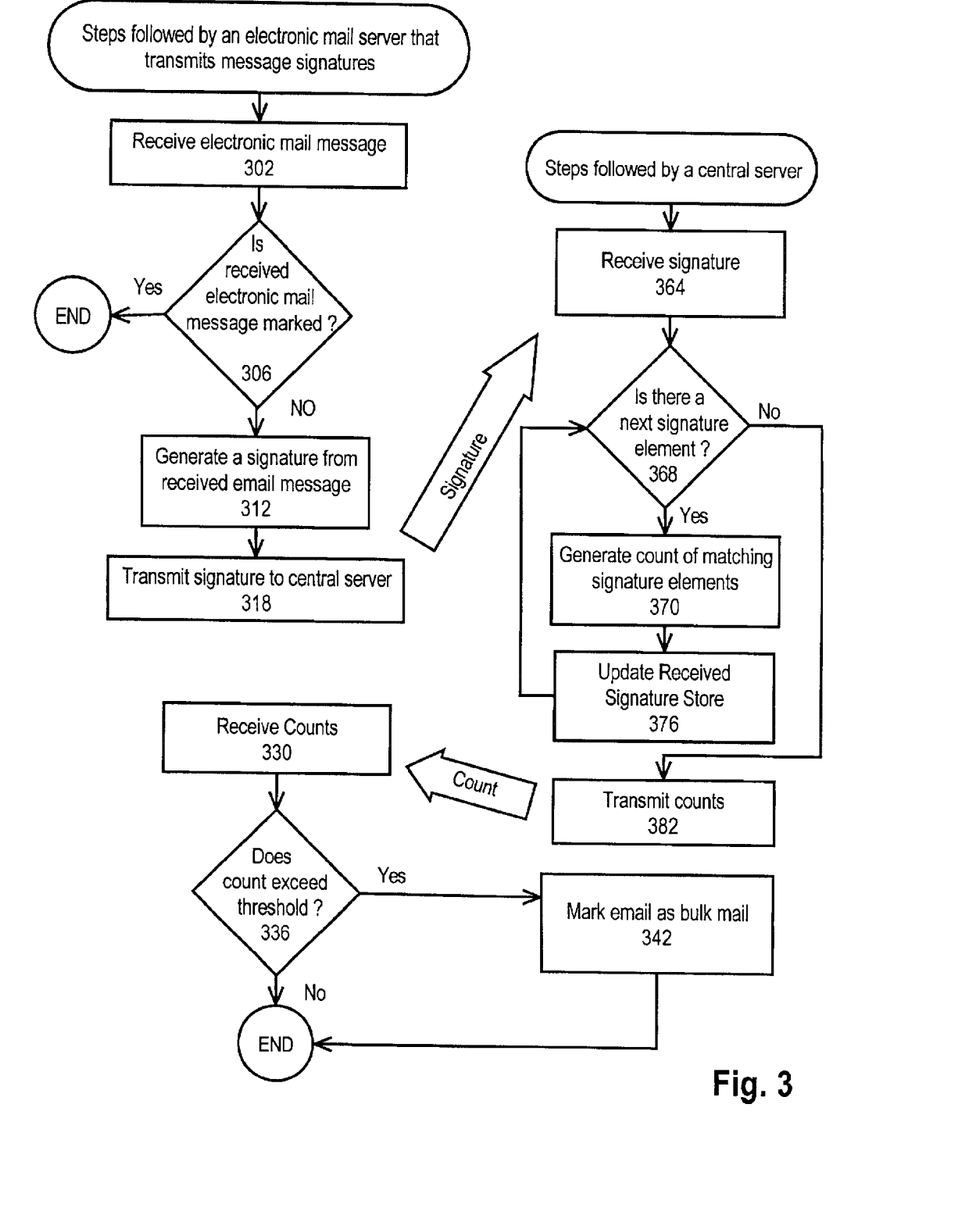
FIG. 3 is flowchart showing a method for identifying electronic mail by transmitting counts of matching signature elements to electronic mail servers according to an embodiment of the present invention.

FIG. 3 is a flowchart showing the steps for identifying bulk electronic mail according to an embodiment of the present invention. The step demonstrates the use of one criterion that may used to determine whether an electronic mail message is bulk. Specifically, the criterion is that the received electronic mail message have a message signature having a signature element that matches a threshold number of signature elements of a message signature generated for other electronic mail messages.

In the manner depicted by FIG. 3, an electronic mail server receives an electronic mail message, and invokes a signature generator to generate a message signature. The message signature is transmitted to a central server. The central server then generates a count for each signature element, each count representing a number of matching signature elements previously received by the central server. A count reflecting the most frequently matched signature element is transmitted from the central server to the electronic mail server. Based on the count, the electronic mail server then makes a determination as to whether or not to mark the received electronic mail message as bulk electronic mail.

The steps shown in FIG. 3 are illustrated using the exemplary electronic mail systems shown in FIG. 1, and exemplary electronic mail message 210, signature generator 120, and message signature 260, shown in FIG. 2.

Referring to FIG. 3, at step 302, an electronic mail message is received by e-mail server 110. In this example, electronic mail message 210 is received.

At step 306, e-mail server 110 determines whether the just received electronic mail message 210 has been marked as bulk electronic mail. If the just received electronic mail message 210 has been marked as bulk electronic mail, then execution of the steps ceases. Otherwise, control flows to step 312. In this example, assume for purposes of illustration that electronic mail message 210 does not contain a bulk electronic mail flag. Therefore, it is determined that the just received electronic mail message has not been marked as bulk electronic mail, and control flows to step 312.

At step 312, a signature is generated from the received electronic mail message. Control then flows to step 318. In this example, electronic mail server 110 invokes signature generator 120 using electronic mail message 210 as input. In response, signature generator 120 generates message signature 260.

At step 318, the generated message signature is transmitted to the central server. In this example, message signature 260 is transmitted from e-mail server 110 to central server 140.

Steps 364 through 382 represent the steps performed by the central server 140 in response to receiving a signature from an electronic mail server. At step 364 in this example, the central server 140 receives message signature 260.

At step 368, it is determined whether there is a next signature element from the received message signature to process. If there is a next signature element to process, control flows to step 370. Otherwise, control flows to step 382, where the highest count is transmitted.

At step 370, the central server generates a count reflecting the number of times the next signature data element is matched by signature elements of previously received message signatures. The central server 140 generates this count by querying the received signature store. If a record with a matching signature element is found, the count is read and incremented. Otherwise, a new record is created and the count is set to one. Control then flows to step 376.

In this example, central server 140 finds a record having a signature element that matches signature element 272. The count from the record is read, and has a value of 10. The count is incremented to 11.

The step for generating the count may be varied according to the structure of the received signature store. For example, assume received signature store 146 contains a record for each receipt of a signature element. Under these conditions, each record contains a signature element and a time stamp that reflects the time that the signature element was received. The central server 140 queries the received signature store to count how many (1) match the received signature element and (2) have time stamps that fall within a threshold period time.

At step 376, the received signature store is updated. If a record was found in step 370, the found record is updated with the incremented count. If the age is non zero, it is set to zero. If a record was not found at step 370, then a new record is created with a count of one and an age of zero. Control then flows to step 368.

Step 376 may be varied according to the structure of the received signature store. For example, assume as mentioned before that the received signature store 146 contains a record for each receipt of a message signature. In this case, a new record is created.

In this example, the count of the just read record in received signature store 146 is updated to 120, and the age is set to zero. Next, control flows to step 368, where it is determined that there is a next signature element to process, i.e. element 274. At step 370, central server 140 finds a record in received signature store 260 having a signature element that matches signature element 274. The count from the record is read, and has a value of 2. The count is incremented to 3. Control flows to step 376, where the just read record is updated, and then to step 368. At step 368, assume that there is no next signature element to process. Control thus flows to step 382.

At step 382, the central server 140 transmits the highest count to the electronic mail server 110 that transmitted the just received message signature.

Steps 330–336 represent the steps performed by electronic mail server 110 in response to receiving a count from a central server 140. In this example, at step 330, electronic mail server 110, receives the just transmitted count from central server 140. Control then flows to step 336.

At step 336, the electronic mail server 110 determines whether or not the just received count exceeds a predetermined threshold. If the count exceeds the predetermined threshold, control then flows to step 342, where the received electronic mail is marked as bulk electronic mail. Otherwise, execution of the steps shown in FIG. 3 ceases. In this example, the received count 11 exceeds the predetermined threshold of 10, therefore control flows to step 342.

At step 342, the electronic mail server marks the electronic mail message as bulk electronic mail. Execution of the steps then ceases. In this example, electronic mail message 210 is marked as bulk electronic mail by adding to electronic mail message 210 bulk mail flag 224 header element with the string "Precedence: Bulk".

After the steps are performed, the electronic mail message 210 may be transmitted to one or more other electronic mail servers, or transmitted to one or more electronic mail clients. These recipients of the electronic mail message may then determine whether or not the electronic mail message will be further received or further processed.

Optionally, at step 442, the electronic mail message is not retransmitted to any other electronic mail server or electronic mail client. Instead, the electronic mail message is simply deleted.

It is not necessary that only the highest count be transmitted to an electronic mail server, or that the criterion be based on the count associated with just one signature element. A central server may, for example, send a count for each signature element. The criterion for determining whether an electronic mail message is bulk electronic mail could then be based on counts associated with more than one signature element. For example, if the sum of the counts associated with two particular elements in a message signature exceeds a threshold, then the received electronic mail message may be marked as bulk.

Broadcasted Bulk Electronic Mail Signatures

In an embodiment of the present invention, the one or more signature elements in a message signature generated from an electronic mail messages that has been identified as bulk electronic mail ("bulk electronic mail signature") are transmitted from the central server 140 to a plurality of "listening electronic mail servers". This technique demonstrates the use of a criterion that may be used to determine whether an electronic mail message is bulk. Specifically, the criterion is that the received electronic mail message have a signature element that matches at least one signature element of an electronic mail message that has been identified as bulk. The term "bulk electronic mail signature" refers to a message signature of an electronic mail message which has been identified as bulk. The term "bulk signature element" refers to a signature element of a bulk electronic mail signature.

A listening electronic mail server is an electronic mail server that is not transmitting signatures of received electronic mail messages to the central server 140, but which receives bulk electronic signature elements. When a listening electronic mail server receives a bulk signature element from a central server, the listening e-mail server then compares of the bulk signature element to signature elements generated for an electronic mail message. If at least one signature element of a received electronic mail message matches a bulk signature element that was received within a threshold period of time, then the electronic mail message is marked as bulk electronic mail.

Figure 4:
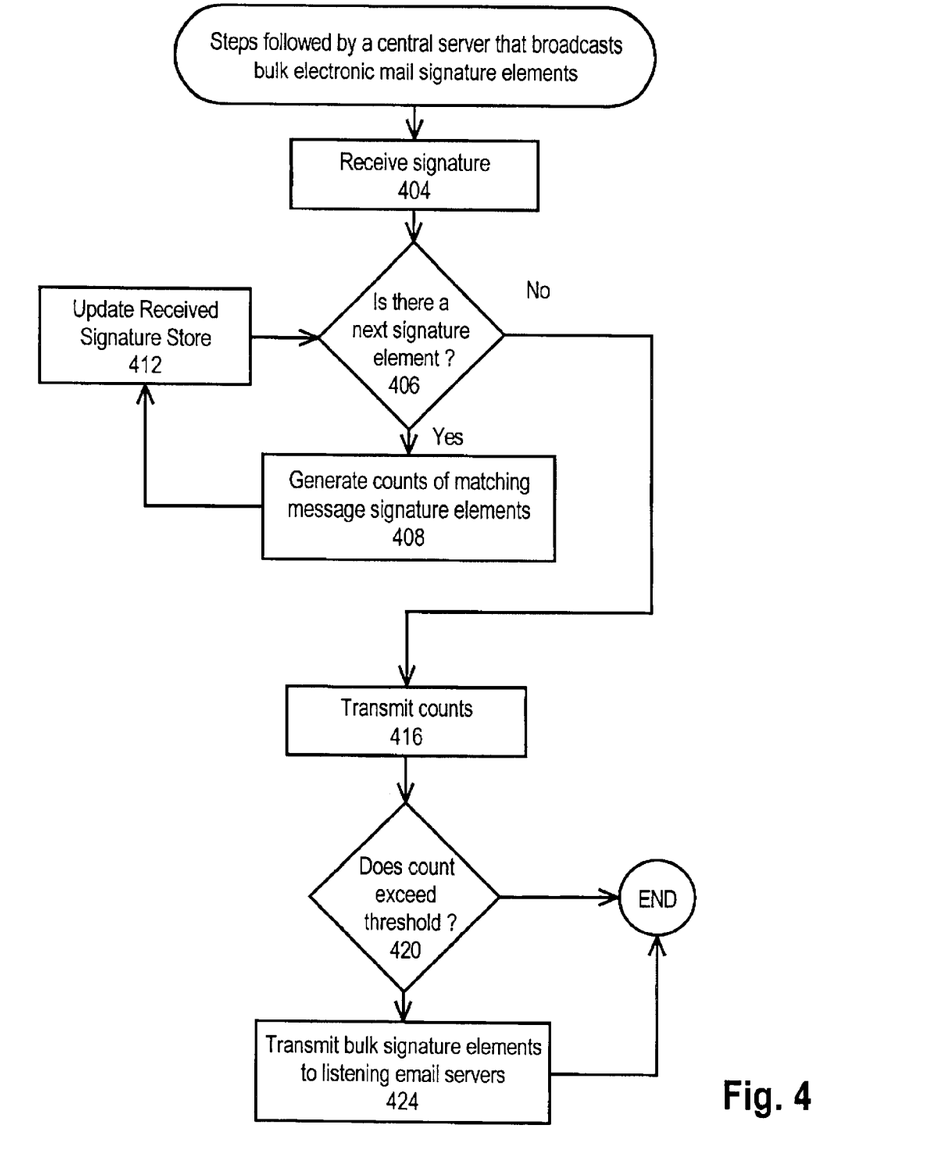
FIG. 4 is flowchart showing steps performed by a central server that transmits signature elements generated from electronic mail messages identified as bulk electronic mail according to an embodiment of the present invention.
Figure 5:
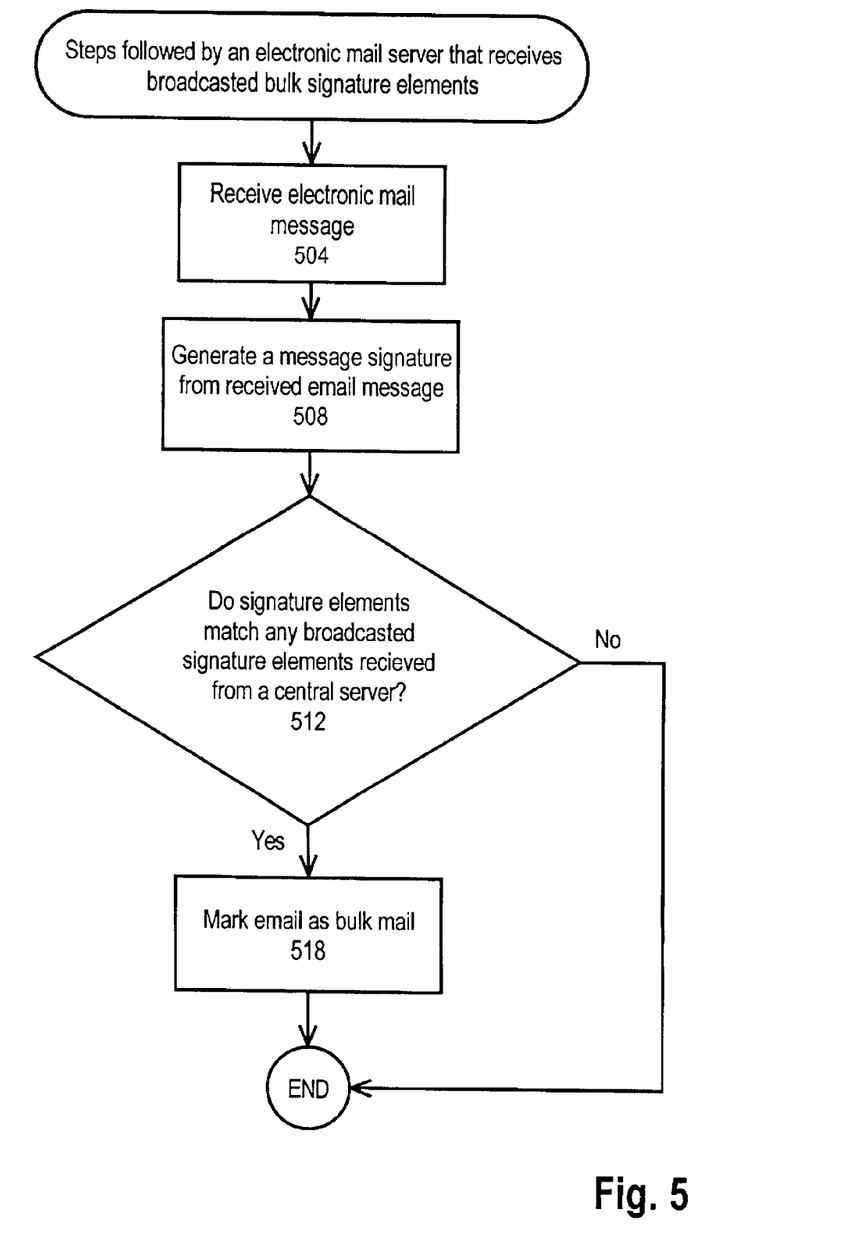
FIG. 5 is flowchart showing steps performed by an electronic mail server that receives signature elements generated from electronic mail messages identified as bulk electronic mail according to an embodiment of the present invention.

FIG. 4 shows steps performed by a central server that broadcasts bulk electronic mail signatures to listening electronic mail servers, and FIG. 5 shows steps performed by a listening electronic mail server.

The steps shown in FIG. 4 and FIG. 5 are illustrated using the exemplary electronic mail system shown in FIG. 1, and exemplary electronic mail message 210 (FIG. 2), signature generator 120, message signature 260, and signature elements shown in FIG. 2. Assume that electronic mail server 110 has received electronic mail message 210, and that electronic mail server 110 has transmitted the message signature 260 to central server 140.

At step 404, the central server 140 receives the signature 260 transmitted from an electronic mail server 110.

At step 406, it is determined whether there is a next signature element from the received message signature to process. If there is a next signature element to process, then control flows to step 408. Otherwise, control flows to step 416.

At step 408, the central server generates a count of matching signatures elements received within a threshold period of time. Step 408 is performed in a manner similar to that described for step 370. In this example, the count generated is 11. Control then flows to step 412.

At step 412, the central server updates the received signature store. Step 412 is performed in a manner similar to that described above with respect to step 376. Control then flows to step 406.

At step 416, the central server 140 transmits the highest count among the received signature elements to the electronic mail server that transmitted the received signature. Step 416 is performed in a manner similar to that described for step 382. Control then flows to step 420.

At step 420, the central server 140 determines whether or not the highest count exceeds a predetermined threshold. If the highest count exceeds a predetermined threshold, control flows to step 424, where the signature element is transmitted as a bulk signature element to one or more listening electronic mail servers. Otherwise, execution of the steps ceases. In this example, central server 140 determines that the predetermined threshold of 10 has been exceeded. Therefore, control flows to step 424.

At step 424, the bulk signature element is transmitted to the listening electronic mail servers. The signature may be efficiently transmitted by, for example, using Internet multicast techniques well known to those skilled in the art. After the execution of step 424, execution of the steps ceases.

FIG. 5 shows the steps performed by a listening electronic mail server upon the receipt of an electronic mail message. Assume for purposes of illustration that central server 140 has transmitted a bulk signature element to listening mail server 170 shown in FIG. 1.

At step 504, a listening electronic mail server receives an electronic mail message. In this example, listening electronic mail server 170 receives an electronic mail message.

At step 508, a message signature is generated from the received electronic mail message. Step 508 is performed in a manner similar to that described for step 312 in FIG. 3. Control then flows to step 512.

At step 512, it is determined whether or not any signature elements of the just generated message signature matches at least one broadcasted bulk signature element received by the listening electronic mail server 170 within a threshold period of time from a central server. If it is determined that any of the just generated message signature elements matches at least one broadcasted bulk signature element received within a threshold period of time, then control flows to step 518. At step 518, the received electronic mail message is marked as bulk electronic mail in a manner similar to that described for step 342. Otherwise, execution of the steps ceases.

In this example, listening electronic mail client 170 examines any broadcasted signature elements received within a threshold period of time, and compares these bulk signature elements with those generated for the received electronic mail signature. Because a broadcasted bulk signature element matches one signature element generated for the received electronic mail signature, control flows to step 518.

In addition to broadcasting bulk electronic mail signatures to listening electronic mail servers, the bulk electronic mail signatures may be broadcast to electronic mail servers that do transmit message signatures to a central server. In the manner similar to that previously described, these electronic mail servers compare the broadcasted bulk signature element to any signature elements of any received electronic mail messages. If a match is found, the received electronic mail message is marked as bulk electronic mail.

Recipient Signatures

If an electronic mail message passes through multiple electronic mail servers that transmit message signatures to a central server without marking the electronic mail message as bulk electronic mail, the central server may count signature the elements in the message signature multiple times even though the message signature is for a single message. As a result, the central server may count a single electronic mail message more than once. For example, a first electronic mail server transmits the message signature for a first mail message to a central server. Once the central server receives the signature, it transmits a count of one to the first electronic mail server. The first electronic mail server then transmits the electronic mail message to a second electronic mail server. The second electronic mail server then generates the message signature and transmits the message signature to the central server. The central server receives the signature and generates a count of two. The central server has thus counted a single message twice.

This multiple counting for the same electronic mail message can be avoided by generating from the recipient data in an electronic mail message a recipient signature such as recipient signature 280. The recipient signature is transmitted along with a message signature to a central server. For example, a one-way hash function can be applied to recipient header 222 (FIG. 2), which contains data identifying the recipient of electronic mail message 210, (e.g. "To:" header field described in RFC #822).

When a central server receives the recipient signature along with a message signature, the central server does not increment the count at step 312 or step 408 if the same recipient signature message signature combination was previously received by the central server. Furthermore, when updating the received signature store (i.e. step 376, step 472), the signature elements are mapped to the recipient signatures with which they arrive. For example, each record in the received signature store may have the form <elem, rsig, time>, where elem is a signature element of a received message signature, rsig is the recipient signature received along with the received message signature, and time is the time at which the message signature and recipient signature were received.

For purposes of illustration, assume that a first electronic mail server receives an electronic mail message. The recipient is "DoeJohn@doe.com". The first electronic mail server invokes its signature generator to generate a message signature and a recipient signature. The message signature and the recipient signature are transmitted to a central server. Because the signature elements in the message signature are not in the signature store, the central server transmits a count of one to the first electronic mail server. Each signature element is then stored in the signature store, and is mapped to the recipient signature.

Subsequently, the first electronic mail server transmits the electronic mail message to a second electronic mail server. The second electronic mail server invokes its signature generator to generate a message signature and a recipient signature. The message signature and the recipient signature are transmitted to the central server. The central server queries the received signature store to determine whether any of the signature elements in the just received message signature and the associated received recipients signature have already been received by the central server. Because each signature element is already mapped to the same recipient signature, the count remains one.

As a form of harassment, the same electronic mail message may be sent to the same recipient multiple times. Because any single combination of a signature element and recipient signature is counted once, it is possible that a bulk electronic mail message directed to the same recipient may go undetected. To overcome this problem, the time an electronic mail message is sent from the originator ("time sent") is transmitted to the central server along with the message signature and recipient signature. The central server would track unique combinations of signature elements, recipient signature, and time sent. Thus, even though multiple copies of the same bulk electronic mail message have the same recipient, the copies would be counted multiple timers because the time sent among the copies varies.

Modifying the Operation of the Signature Generator

It is possible that originators of bulk electronic mail can circumvent detection by, for example, inserting randomly generated data in each electronic bulk electronic mail message transmitted. Inserting the randomly generated data in this manner varies the message signatures generated for each of the set of otherwise identical bulk electronic mail messages. To overcome counter measures to detection, the operation of the routines (e.g. functions, procedures, object methods) that comprise the signature generator may need to be modified. To facilitate a rapid response to the counter measures, a server such as a central or remote server, may transmit messages that include code or data that is used to alter the operation of a signature generator. The term remote server refers to a process on a computer system that is communicated with over a network.

In an embodiment of the present invention, a signature generator may include Java™ byte code. The central server transmits updates to the implementation of the signature generator by transmitting Java™ byte code to the electronic mail server with which the signature generator resides. In another embodiment of the present invention, the central server sends data for parameters which control the operation of the signature generator. And in yet another embodiment of the present invention, the central server transmits executable machine code (e.g. an executable file a, dynamically linked library "DLL"), i.e. software that may be executed to run a signature generator.

Multiple Servers

To avoid potential bottlenecks that might occur if all message signatures were sent to one busy central server, multiple central servers may be used. An electronic mail server may thus send a message signature to any one of the multiple servers. To choose a central server to which to transmit a signature, any number of techniques may used. The present invention is not limited to any particular technique for choosing a central server.

For example, the choice can be based on the value of a particular signature element and a set of ranges. If the particular signature element falls into a first range, the electronic mail server transmits the message signature to a first central server. If the particular signature element falls into a second range, the electronic mail server transmits the message signature to a second central server.

Hardware Overview

Figure 6:
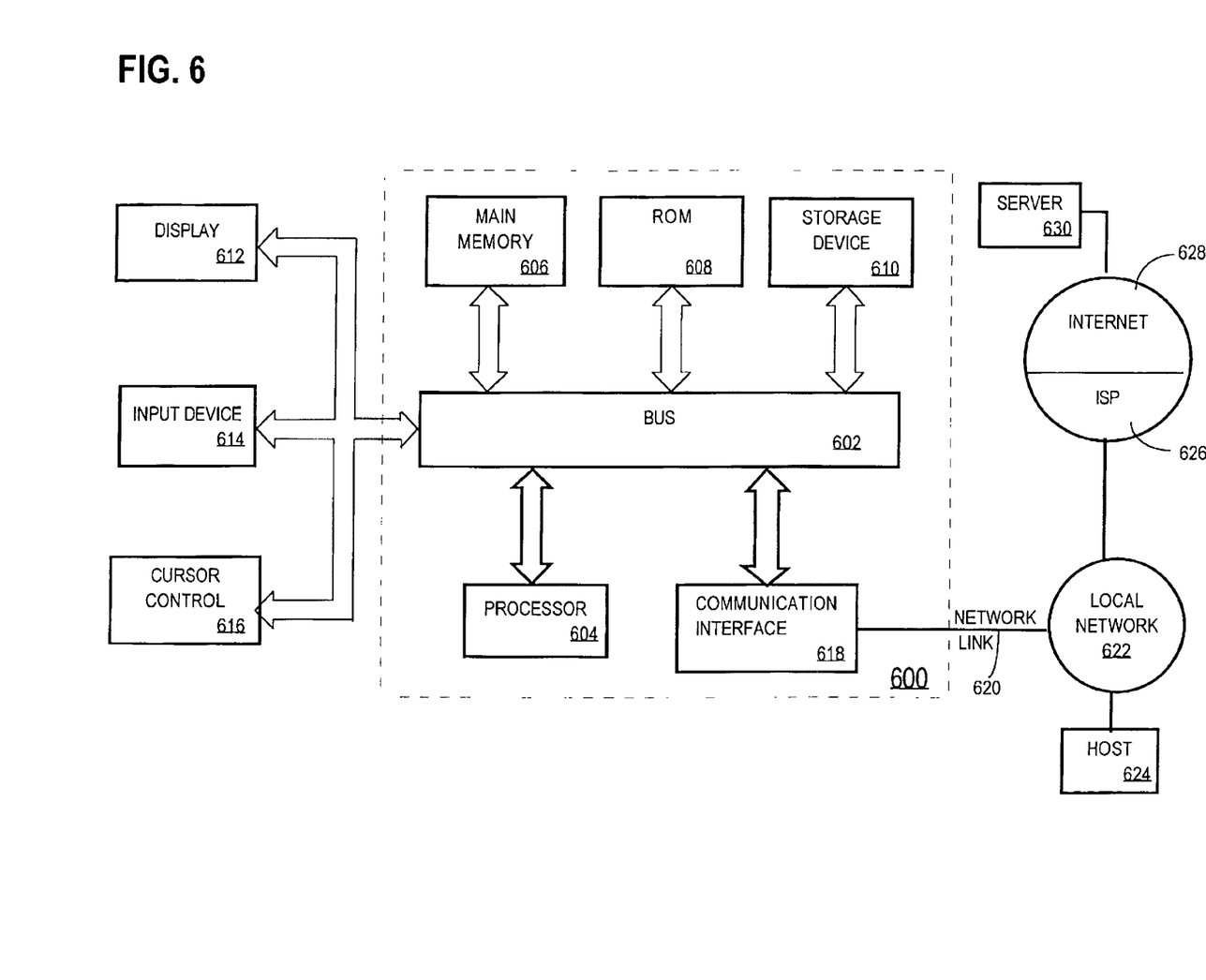
FIG. 6 is block diagram depicting a computer system upon which an embodiment of the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for filtering electronic mail. According to one embodiment of the invention, filtering electronic mail is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for filtering electronic mail as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing electronic mail, the method comprising the computer-implemented steps of:
   automatically generating certain criteria based on contents of a plurality of electronic mail messages received over a network;
   wherein the step of automatically generating certain criteria includes:
     automatically determining what particular content to use to identify electronic mail messages as a first type of electronic mail message by performing steps that include determining that a threshold number of said plurality of electronic mail messages have a particular content, and
     in response to determining that a threshold number of said plurality of electronic mail messages have said particular content, generating one or more criteria that identifies electronic mail messages that have said particular content as the first type of electronic mail;
   receiving an electronic mail message over said network;
   determining whether said electronic mail message satisfies said one or more criteria;
   if said electronic mail message satisfies said one or more criteria, then processing said electronic mail message as said first type of electronic mail;
   if said electronic mail message does not satisfy said one or more criteria, then processing said electronic mail message as a second type of electronic mail;
   wherein said first type of electronic mail is processed differently than said second type of electronic mail; and
   wherein at least one electronic mail message of said plurality of electronic mail messages has not been classified, before determining that a threshold number of said plurality of electronic mail messages have a particular content, as belonging to said first type.

2. The method of claim 1 wherein:
   the method further comprises the step of generating a message signature for said electronic mail message based on contents of said electronic mail message; and
   the step of determining whether said electronic mail message satisfies one or more criteria is based on said message signature.

3. The method of claim 1, wherein determining that a threshold number of said plurality of electronic mail messages have a particular content includes determining that at least a portion of each of said plurality of electronic mail messages have said particular content.

4. The method of claim 1, wherein the step of generating certain criteria based on contents of a plurality of electronic mail messages received over said network includes tracking how many message signature elements of said plurality of electronic mail messages match.

5. The method of claim 1 wherein the step of generating certain criteria based on contents of a plurality of electronic mail messages received over said network includes the steps of:
   generating message signatures for each electronic mail message of said plurality of electronic mail messages, wherein each message signature includes one or more message signature elements; and
   counting how many of said one or more message signature elements match message signature elements from other message signatures.

6. The method of claim 5 wherein the step of determining whether said electronic mail message satisfies said one or more criteria includes determining whether a message signature generated for said electronic mail message includes at least one message signature element that matches a threshold number of message signature elements of previously generated message signatures.

7. The method of claim 6 wherein the step of determining whether a message signature generated for said electronic mail message includes at least one message signature element that matches a threshold number of message signature elements further includes determining whether a message signature generated for said electronic mail message includes at least one message signature element that matches a threshold number of message signature elements of previously generated message signatures that are associated with a period of time.

8. The method of claim 1 wherein the step of processing said electronic mail message as a first type of electronic mail includes adding a bulk electronic mail flag to said electronic mail message.

9. The method of claim 8, further including the steps of:
   after processing said electronic mail message as a first type of electronic mail, transmitting said electronic mail message to an electronic mail server;
   said electronic mail server receiving said electronic mail message;
   said electronic mail server determining whether said electronic mail message contains said bulk electronic mail flag; and
   if said electronic mail message contains said bulk electronic mail flag, then processing said electronic mail message without further verifying whether said electronic mail message is bulk electronic mail.

10. A method of managing electronic mail, the method comprising the steps of:
    a central server receiving message signatures from a set of electronic mail servers;
    automatically determining what particular content to use to identify electronic mail messages as bulk electronic mail by performing steps that include determining that a threshold number of message signatures received by said central server from said set of electronic mail servers match;
    in response to determining that a threshold number of message signatures received by said central server from said set of electronic mail servers match, generating a set of one or more criteria that identifies electronic mail messages that have said particular content as bulk electronic mail;
    an electronic mail server determining whether a particular message signature for an electronic mail message satisfies said set of one or more criteria;
    if said particular message signature satisfies said set of one or more criteria, then said electronic mail server processing said electronic mail message as bulk electronic mail;
    wherein said threshold number of message signatures are generated from a plurality electronic mail messages; and
    wherein said plurality of electronic mail messages include at least one message that has not been identified, as bulk electronic mail, before determining that a threshold number of message signatures received by said central server from said set of electronic mail servers match.

11. The method of claim 10, wherein the step of a central server receiving from an electronic mail server message signatures includes receiving a set of one or more values generated by a one-way hash function.

12. The method of claim 11, the method further including the step of transmitting one or more messages to said electronic mail server specifying changes to one or more routines invoked by said electronic mail server to generate message signatures.

13. The method of claim 12, wherein the step of transmitting one or more messages includes transmitting platform-independent byte code.

14. A method of managing electronic mail transmitted over a network, the method comprising the steps of:
a central server receiving from a set of electronic mail servers certain message signatures generated from a plurality electronic mail messages received by said set of electronic mail servers, wherein each message signature of said certain message signatures includes one or more message signature elements;
said central server generating a count of how many times said one or more message signature elements are matched by message signature elements from message signatures generated for other electronic mail messages of said plurality of electronic mail messages;
automatically determining what particular content to use to identify electronic mail messages as a first type of electronic mail message by performing steps that include determining that a threshold number of said plurality of electronic mail messages have a particular content based on said count; and
in response to deteemining that a threshold number of said plurality of electronic mail messages have said particular content, generating one or more criteria that identifies electronic mail messages that have said particular content as the first type of electronic mail;
wherein at least one message of said plurality of electronic mail messages has not been classified, before determining that a threshold number of said plurality of electronic mail messages have a particular content, as belonging to said first type; and
said central server transmitting a message reflecting said one or more criteria.

15. The method of claim 14, wherein:
the step of a central server receiving includes receiving a particular recipient signature associated with a particular message signature; and
the step of generating counts includes generating counts of how many times said one or more message signature elements match message signature elements that are:
generated for other electronic mail messages, and
associated with a recipient signature that differs from said particular recipient signature.

16. The method of claim 15, wherein the step of transmitting messages includes transmitting message signature elements associated with counts greater than a threshold.

17. A computer-readable medium carrying one or more sequences of one or more instructions for managing electronic mail, wherein the execution of the one or more sequences of the one or more instructions causes the one or more processors to perform the steps of:
automatically generating certain criteria based on contents of a plurality of electronic mail messages received over a network;
wherein the step of automatically generating certain criteria includes:
automatically determining what particular content to use to identify electronic mail messages as a first type of electronic mail message by performing steps that include determining that a threshold number of said plurality of electronic mail messages have a particular content, and
in response to determining that a threshold number of said plurality of electronic mail messages have said particular content, generating one or more criteria that identifies electronic mail messages that have said particular content as the first type of electronic mail;
receiving an electronic mail message over said network;
determining whether said electronic mail message satisfies said one or more criteria;
if said electronic mail message satisfies said one or more criteria, then processing said electronic mail message as said first type of electronic mail;
if said electronic mail message does not satisfy said one or more criteria, then processing said electronic mail message as a second type of electronic mail;
wherein said first type of electronic mail is processed differently than said second type of electronic mail; and
wherein at least one electronic mail message of said plurality of electronic mail messages has not been classified, before determining that a threshold number of said plurality of electronic mail messages have a particular content, as belonging to said first type.

18. The computer-readable medium of claim 17 wherein:
the computer-readable medium comprises sequences of instructions for performing the step of generating a message signature for said electronic mail message based on contents of said electronic mail message; and
the step of determining whether said electronic mail message satisfies said one or more is based on said message signature.

19. The computer-readable medium of claim 17 wherein determining that a threshold number of said plurality of electronic mail messages have a particular content includes determining that at least a portion of each of said plurality of electronic mail messages have said particular content.

20. The computer-readable medium of claim 17 wherein the step of generating certain criteria based on contents of a plurality of electronic mail messages received over said network includes tracking how many messages signature elements of said plurality of electronic mail messages match.

21. The computer-readable medium of claim 17 wherein the step of generating certain criteria based on contents of a plurality of electronic mail messages received over said network includes the step of:
generating message signatures for each electronic mail message of said plurality of electronic mail messages, wherein each message signature includes one or more message signature elements; and
counting how many of said one or more message signature elements match message signature elements from other message signatures.

22. The computer-readable medium of claim 21 wherein the step of determining whether said electronic mail message satisfies said one or more criteria includes determining whether a message signature generated for said electronic mail message includes at least one message signature element that matches a threshold number of message signature elements of previously generated message signatures.

23. The computer-readable medium of claim 22 wherein the step of determining whether a message signature generated for said electronic mail message includes at least one message signature element that matches a threshold number of message signature elements further includes determining whether a message signature generated for said electronic mail message includes at least one message signature element that matches a threshold number of message signature elements of previously generated message signatures that are associated with a period of times.

24. The computer-readable medium of claim 17 wherein the step of processing said electronic mail message as a first type of electronic mail includes adding a bulk electronic mail flag to said electronic mail message.

25. The computer-readable medium of claim 24, the steps further including
after processing said electronic mail message as first type of electronic mail, transmitting said electronic mail message to an electronic mail server;
said electronic mail server receiving aid electronic mail message;
said electronic mail server determining whether said electronic mail message contains said bulk electronic mail flag; and
if said electronic mail message contain said bulk electronic mail flag, then processing said electronic mail message without further verifying whether said electronic mail message is bulk electronic mail.

26. A computer-readable medium carrying one or more sequences of one or more instructions for managing electronic mail, wherein the execution of the one or more sequences of the one or more instructions causes the one or more processors to perform the steps of:
a central server receiving message signatures from a set of electronic mail servers;
automatically determining what particular content to use to identify electronic mail messages as bulk electronic mail by performing steps that include determining that a threshold number of message signatures received by said central server from said set of electronic mail servers match;
in response to determining that a threshold number of message signatures received by said central server from said set of electronic mail servers match, generating a set of one or more criteria that identifies electronic mail messages that have said particular content as bulk electronic mail;
an electronic mail server determining whether a particular message signature for an electronic mail message satisfies said set of one or more criteria;
if said particular message signature satisfies said set of one or more criteria, then said electronic mail server processing said electronic mail message as bulk electronic mail;
wherein said threshold number of message signatures are generated from a plurality electronic mail messages; and
wherein said plurality of electronic mail messages include at least one message that has not been identified, as bulk electronic mail, before determining that a threshold number of message signatures received by said central server from said set of electronic mail servers match.

27. The computer-readable medium of claim 26, wherein the step of a central server receiving form an electronic mail server message signatures includes receiving a set of one or more values generated by a one-way hash function.

28. The computer-readable medium of claim 27, the steps further including the step of transmitting one or more messages to said electronic mail server specifying changes to one or more routines invoked by said electronic mail server to generate message signatures.

29. The computer-readable medium of claim 28, wherein the step of transmitting one or more messages including transmitting platform-independent byte code.

30. A computer-readable medium carrying one or more sequences of one or more instructions for managing electronic mail, wherein the execution of the one or more sequences of the one or more instructions causes the one or more processors to perform the steps of:
a central server receiving from a set of electronic mail servers certain message signatures generated from a plurality electronic mail messages received by said set of electronic mail servers, wherein each message signature of said certain message signatures includes one or more message signature elements;
said central server generating a count of how many times said one or more message signature elements are matched by message signature elements from message signatures generated for other electronic mail messages of said plurality of electronic mail messages;
automatically determining what particular content to use to identify electronic mail messages as a first type of electronic mail message by performing steps that include determining that a threshold number of said plurality of electronic mail messages have a particular content based on said count; and
in response to determining that a threshold number of said plurality of electronic mail messages have said particular content, generating one or more criteria that identifies electronic mail messages that have said particular content as the first type of electronic mail;
wherein at least one message of said plurality of electronic mail messages has not been classified, before determining that a threshold number of said plurality of electronic mail messages have a particular content, as belonging to said first type; and
said central server transmitting a message reflecting said one or more criteria.

31. The computer-readable medium of claim 30, wherein:
the step of a central server receiving includes receiving a particular recipient signature associated with a particular message signature; and
the step of generating counts includes generating counts of how many times said one or more message signature elements match message signature elements that are:
generated for other electronic mail messages, and
associated with a recipient signature that differs from said particular recipient signature.

32. The computer-readable medium of claim 31, wherein the step of transmitting messages includes transmitting message signature elements associated with counts greater than a threshold.

33. A method of managing electronic mail, the method comprising the computer-implemented steps of:
automatically generating certain criteria based on contents of a plurality of electronic mail messages received over a network;
wherein the step of automatically generating certain criteria includes, in response to determining that a threshold number of said plurality of electronic mail messages have a particular content, generating one or more criteria that classifies electronic mail messages that have said particular content as a first type of electronic mail;

receiving an electronic mail message over said network;

determining whether said electronic mail message satisfies said one or more criteria;

if said electronic mail message satisfies said one or more criteria, then processing said electronic mail message as said first type of electronic mail;

if said electronic mail message does not satisfy said one or more criteria, then processing said electronic mail message as a second type of electronic mail;

wherein said first type of electronic mail is processed differently than said second type of electronic mail;

wherein the step of determining that a threshold number of said plurality of electronic mail messages have a particular content includes the steps of:
  generating message signatures for each electronic mail message of said plurality of electronic mail messages, wherein each message signature includes one or more signature elements, and
  counting how many of said one or more signature elements match signature elements from other message signatures; and wherein at least one electronic mail message of said plurality of electronic mail messages has not been classified, before determining that a threshold number of said plurality of electronic mail messages have a particular content, as belonging to said first type.

34. The method of claim 33 wherein the step of determining whether said electronic mail message satisfies said one or more criteria includes determining whether a message signature generated for said electronic mail message includes at least one signature element that matches a threshold number of signature elements of previously generated message signatures.

35. The method of claim 34 wherein the step of determining whether a message signature generated for said electronic mail message includes at least one signature element that matches a threshold number of signature elements further includes determining whether a message signature generated for said electronic mail message includes at least one signature element that matches a threshold number of signature elements of previously generated message signatures that are associated with a period of time.

36. A computer-readable medium carrying one or more sequences of one or more instructions for managing electronic mail, wherein the execution of the one or more sequences of the one or more instructions causes the one or more processors to perform the steps of:
  automatically generating certain criteria based on contents of a plurality of electronic mail messages received over a network;
  wherein the step of automatically generating certain criteria includes, in response to determining that a threshold number of said plurality of electronic mail messages have a particular content, generating one or more criteria that classifies electronic mail messages that have said particular content as a first type of electronic mail;

receiving an electronic mail message over said network;

determining whether said electronic mail message satisfies said one or more criteria;

if said electronic mail message satisfies said one or more criteria, then processing said electronic mail message as said first type of electronic mail;

if said electronic mail message does not satisfy said one or more criteria, then processing said electronic mail message as a second type of electronic mail;

wherein said first type of electronic mail is processed differently than said second type of electronic mail;

wherein the step of determining that a threshold number of said plurality of electronic mail messages have a particular content includes the steps of:
  generating message signatures for each electronic mail message of said plurality of electronic mail messages, wherein each message signature includes one or more signature elements, and
  counting how many of said one or more signature elements match signature elements from other message signatures; and wherein at least one electronic mail message of said plurality of electronic mail messages has not been classified, before determining that a threshold number of said plurality of electronic mail messages have a particular content, as belonging to said first type.

37. The computer-readable medium of claim 36 wherein the step of determining whether said electronic mail message satisfies said one or more criteria includes determining whether a message signature generated for said electronic mail message includes at least one signature element that matches a threshold number of signature elements of previously generated message signatures.

38. The computer-readable medium of claim 37 wherein the step of determining whether a message signature generated for said electronic mail message includes at least one signature element that matches a threshold number of signature elements further includes determining whether a message signature generated for said electronic mail message includes at least one signature element that matches a threshold number of signature elements of previously generated message signatures that are associated with a period of time.

* * * * *

UNITED STATES PATENT AND TRADEMARK OFFICE
CERTIFICATE OF CORRECTION

PATENT NO. : 6,829,635 B1
DATED : December 7, 2004
INVENTOR(S) : Brent Townshend It is certified that error appears in the above-identified patent and that said Letters Patent is hereby corrected as shown below:

Column 17,
Line 32, delete "deteeming" and insert -- determining --.

Column 18,
Line 31, after "medium" and before "comprises" insert -- further --.
Line 47, delete "messages" and insert -- message --.

Column 19,
Line 20, delete "aid" and insert -- said --.
Line 25, delete "contain" and insert -- contains --.
Line 67, delete "form" and insert -- from --.

Column 20,
Line 9, delete "including" and insert -- includes --.

Signed and Sealed this

Fifth Day of April, 2005

JON W. DUDAS
*Director of the United States Patent and Trademark Office*